US012664137B2

(12) United States Patent
Ooi et al.

(10) Patent No.: US 12,664,137 B2
(45) Date of Patent: Jun. 23, 2026

(54) SYSTEMS AND METHODS FOR GENERATING DATA LINEAGE AND TRACING DATA CHANGES

(71) Applicant: Dell Products L.P., Round Rock, TX (US)

(72) Inventors: Lee Chuen Ooi, Lilydale (SG); Harikrishnan Nair Gopalakrishnan, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 18/173,917

(22) Filed: Feb. 24, 2023

(65) Prior Publication Data

US 2024/0289310 A1     Aug. 29, 2024

(51) Int. Cl.
| | |
|---|---|
| *G06F 16/00* | (2019.01) |
| *G06F 11/34* | (2006.01) |
| *G06F 16/21* | (2019.01) |
| *G06F 16/23* | (2019.01) |

(52) U.S. Cl.
CPC ........ *G06F 16/219* (2019.01); *G06F 11/3419* (2013.01); *G06F 16/2358* (2019.01)

(58) Field of Classification Search
CPC . G06F 16/219; G06F 16/2358; G06F 11/3419
See application file for complete search history.

(56) References Cited

U.S. PATENT DOCUMENTS

| | | | | |
|---|---|---|---|---|
| 8,645,824 B2 * | 2/2014 | Baer | ..................... | G06F 40/194 |
| | | | | 715/255 |
| 8,988,427 B2 * | 3/2015 | Doganata | ............ | G06F 16/9024 |
| | | | | 345/422 |
| 9,348,879 B2 * | 5/2016 | Mohammad | ......... | G06Q 10/063 |
| 9,542,662 B2 * | 1/2017 | Roesch | ............... | G06Q 10/063 |
| 9,811,573 B1 * | 11/2017 | Xiang | ..................... | G06F 16/26 |
| 10,452,625 B2 * | 10/2019 | Mukherjee | ............ | G06F 16/221 |

(Continued)

OTHER PUBLICATIONS

Theoretical Model and Practical Considerations for Data Lineage Reconstruction, Egor Pushkin (Year: 2020).*

(Continued)

*Primary Examiner* — Jean M Corrielus
(74) *Attorney, Agent, or Firm* — DALY, CROWLEY, MOFFORD & DURKEE, LLP

(57) ABSTRACT

In one aspect, an example methodology implementing the disclosed techniques includes, by a computing device, receiving information about a data element affected by a data change and generating a data lineage of the data element, wherein the data lineage indicates relationships between the data element and one or more other data elements, the one or more other data elements indicated in the received information about the data element. The method also includes, by the computing device, generating a lineage template for the data element based on data lineage information, wherein the lineage template defines a workflow for the data element to complete the data change in the data lineage, and generating a lineage graph based on the data lineage information, wherein the lineage graph tracks the data lineage of the data element. The method may further include monitoring performance of the workflow using the lineage graph.

17 Claims, 11 Drawing Sheets

400

(56) References Cited

U.S. PATENT DOCUMENTS

| | | | | |
|---|---|---|---|---|
| 10,489,384 | B2 * | 11/2019 | Gould | G06F 16/9024 |
| 10,503,905 | B1 * | 12/2019 | Misra | G06F 21/64 |
| 10,635,700 | B2 * | 4/2020 | Arora | G06F 9/45558 |
| 10,769,165 | B2 * | 9/2020 | Simon | G06F 16/254 |
| 11,204,924 | B2 * | 12/2021 | Lutz | G06F 16/24552 |
| 11,226,957 | B2 * | 1/2022 | Gould | G06F 11/3604 |
| 11,301,444 | B2 * | 4/2022 | Jacob Sushil | G06F 16/25 |
| 11,397,720 | B2 * | 7/2022 | Muralidhar | G06F 16/278 |
| 11,526,533 | B2 * | 12/2022 | Baek | G06F 16/219 |
| 11,755,536 | B1 * | 9/2023 | Pushkin | G06F 11/3495 |
| | | | | 707/803 |
| 12,130,789 | B1 * | 10/2024 | Lin | G06F 16/219 |
| 2006/0230338 | A1 * | 10/2006 | Kelkar | H04L 67/02 |
| | | | | 715/205 |
| 2011/0113326 | A1 * | 5/2011 | Baer | G06F 40/194 |
| | | | | 709/204 |
| 2012/0173747 | A1 * | 7/2012 | Roesch | G06Q 10/063 |
| | | | | 709/231 |
| 2013/0018858 | A1 * | 1/2013 | Velasco | G06F 16/93 |
| | | | | 707/694 |
| 2014/0114907 | A1 * | 4/2014 | Kozina | G06F 16/219 |
| | | | | 707/602 |
| 2014/0279979 | A1 * | 9/2014 | Yost | G06F 16/904 |
| | | | | 707/798 |
| 2015/0012478 | A1 * | 1/2015 | Mohammad | G06F 16/254 |
| | | | | 707/602 |
| 2016/0012153 | A1 * | 1/2016 | Gralnick | G06F 16/9024 |
| | | | | 707/743 |
| 2016/0148249 | A1 * | 5/2016 | Marth | G06Q 10/101 |
| | | | | 705/14.42 |
| 2016/0148277 | A1 * | 5/2016 | Marth | G06Q 10/101 |
| | | | | 705/14.72 |
| 2018/0089155 | A1 * | 3/2018 | Baron | G06F 40/197 |
| 2018/0129699 | A1 * | 5/2018 | Gould | G06F 16/288 |
| 2018/0189369 | A1 * | 7/2018 | Baek | G06F 16/219 |
| 2019/0138654 | A1 * | 5/2019 | Arora | G06F 9/45558 |
| 2019/0188308 | A1 * | 6/2019 | Simon | G06F 16/219 |
| 2019/0361905 | A1 * | 11/2019 | Rogynskyy | G06Q 10/107 |
| 2019/0362290 | A1 * | 11/2019 | Rogynskyy | G06Q 10/107 |
| 2020/0050598 | A1 * | 2/2020 | Gould | G06F 16/288 |
| 2020/0201862 | A1 * | 6/2020 | Lutz | G06F 16/2365 |
| 2020/0201930 | A1 * | 6/2020 | Lutz | G06F 16/9024 |
| 2021/0326366 | A1 * | 10/2021 | Chandrahasan | G06F 16/38 |
| 2021/0342321 | A1 * | 11/2021 | Jacob Sushil | G06F 16/1734 |
| 2022/0229849 | A1 * | 7/2022 | Stigsen | G06F 7/14 |
| 2022/0303295 | A1 * | 9/2022 | Erlingsson | G06F 21/552 |
| 2022/0374413 | A1 * | 11/2022 | Gould | G06F 16/9024 |
| 2022/0398186 | A1 * | 12/2022 | Mudumba | G06F 11/3688 |
| 2023/0016909 | A1 * | 1/2023 | Lutz | H04N 21/222 |
| 2023/0023208 | A1 * | 1/2023 | Lutz | G06F 16/9024 |
| 2023/0086750 | A1 * | 3/2023 | Battistoni | G06F 11/328 |
| | | | | 707/694 |
| 2023/0091775 | A1 * | 3/2023 | Manzano | G06F 16/212 |
| | | | | 707/756 |

OTHER PUBLICATIONS

A conceptual framework for composing and managing scientific data lineage, IEEE, Rajendra Bose (Year: 2002).*

Enhancing Organizational Data Integrity and Efficiency through Effective Data Lineage, IEEE, Carlo et al., (Year: 2023).*

* cited by examiner

500

| Sequence | Timestamp | Part | Part content | Part price | Product |
|---|---|---|---|---|---|
| 1 | 2022-08-11T01:31:56Z | id:101; version:1 | | | |
| 2 | 2022-08-11T01:50:33Z | | id:c1; version:1 References: {part, id:101, version:1} | | |
| 3 | 2022-08-11T02:15:01Z | | | id:p1; version:1 References: {part, id:101, version:1} | |
| 4 | 2022-08-14T11:15:16Z | | | | id:uxw203fl; version:10 References: {part, id:101, version:1; part-price, id:p1, version:1} |

| Sequence | Timestamp | | Product content | Product price | Composite |
|---|---|---|---|---|---|
| 1 | 2022-08-11T01:31:56Z | ... | | | |
| 2 | 2022-08-11T01:50:33Z | ... | | | |
| 3 | 2022-08-11T02:15:01Z | ... | | | |
| 4 | 2022-08-14T11:15:16Z | ... | | | |
| 5 | 2022-08-11T1:31:56Z | ... | | | |
| 6 | 2022-08-11T01:50:33Z | ... | id:prodc1; version:11 References: {product-part, id:uxw203fl, version:10} | | |
| 7 | 2022-08-11T02:15:01Z | ... | | id:prodp1; version:8 References: {product-part, id:uxw203fl, version:10} | |
| 8 | 2022-08-14T11:15:16Z | ... | | | id:compuxw203fl; version:25 References:[ {product-part, id:uxw203fl, version 10}, {product-price, id:prodp1, version:8}, {product-content, id:prodc1, version:11} ] |

| Lineage | Step | Order | Mean (s) | Min (s) | Max (s) | Alert Timeout (s) | Optional (y/n) |
|---------|------|-------|----------|---------|---------|-------------------|----------------|
| Part A | Part-Content | 1 | 7721 | 1173 | 12391 | 14400 | n |
| Part A | Part-Price | 1 | 10239 | 6201 | 21578 | 30000 | n |
| Part A | Product-Part | 2 | 1267 | 366 | 3656 | 6000 | n |
| Part A | Product-Content | 3 | 8982 | 1120 | 12452 | 24000 | y |
| Part A | Product-Price | 3 | 12394 | 7453 | 20293 | 30000 | y |

Receive information about a data element affected
by a data change
1002

Generate a data lineage of the data element
1004

Generate a lineage template for the data element
1006

Generate a lineage graph
1008

Monitor performance of a workflow for the data element
to complete its data lineage
1010

SYSTEMS AND METHODS FOR GENERATING DATA LINEAGE AND TRACING DATA CHANGES

BACKGROUND

Data lineage relates to understanding, recording, and visualizing data as it flows from data sources to consumption. Data lineage is the process of describing the origin of data, recording how the data transforms and moves through its lifecycle, and visualizing its flow from source to destination. Data lineage includes the process of enrichment, in which data produced in one domain is extended by other data domains to produce composites. Data lineage also includes the process of transformation where data is combined by system and business logic to create projections or transformations for various reasons such as, for example, system performance, reporting, or analytics.

Each enrichment or transformation of data is based on a certain version of the data. In addition, it is important to know what a given composite or transformation of data is based on, or if a certain upstream change to data has made its way to all downstream systems, composites, or transformations. With the breadth of data extending across multiple systems, data centers and availability zones, keeping track of data in motion pose significant challenges.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, receiving information about a data element affected by a data change and generating a data lineage of the data element, wherein the data lineage indicates relationships between the data element and one or more other data elements, the one or more other data elements indicated in the received information about the data element. The method also includes, by the computing device, generating a lineage template for the data element based on data lineage information, wherein the lineage template defines a workflow for the data element to complete the data change in the data lineage, and generating a lineage graph based on the data lineage information, wherein the lineage graph tracks the data lineage of the data element.

In some embodiments, the information about the data element includes identification and versioning information and referentiality information of the data element. In one aspect, the one or more other data elements being indicated in the referentiality information.

In some embodiments, the lineage template defines one or more actions for the workflow, wherein an action of the one or more actions having values that indicate a sequencing of the action, an average time to perform the action, a minimum time to perform the action, a maximum time to perform the action, and a timeout to generate an alert.

In some embodiments, the lineage template provides for indicating creation, completion, and status of data tasks.

In some embodiments, the method also includes monitoring performance of the workflow using the lineage graph. In one aspect, the lineage graph shows that the workflow is completed. In one aspect, the lineage graph shows that the workflow is partially completed.

In some embodiments, the generating the data lineage includes updating an existing data lineage of the data element.

In some embodiments, the generating the lineage template includes identifying an existing lineage template generated for the data element.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 is a diagram illustrating a portion of a structured table for maintaining data lineage information, in accordance with an embodiment of the present disclosure.

FIG. 6 is a diagram illustrating an example lineage template for a data element, in accordance with an embodiment of the present disclosure.

DETAILED DESCRIPTION

Data lineage (sometimes referred to herein more simply as "lineage") refers to the journey of data over time. Being able to trace data through its lineage and understanding its composition at any point is important because it ensures that an organization's data is accurate and trusted. Without data lineage, the organization has no visibility into the correctness of their data, and therefore, could be basing important decisions off inaccurate and incomplete data. For example, modern system architectures leverage pre-processing, background processing, and edge delivery of data. This can involve transforming and enriching data and making data available locally to multiple edges (e.g., edge systems) and processing nodes. While this process makes such system architectures performant, scalable, and available, the process of ensuring data consistency remains a challenge.

Certain embodiments of the concepts, techniques, and structures disclosed herein are directed to a framework that enables traceability of data, including changes to data, in an ecosystem. The traceability can be achieved through identification and versioning, referentiality, and lineage detection. Identification and versioning relate to uniquely identifying each data element (sometimes referred to herein as "data item" or more simply as "data") with strong versioning. Identification can be by any strategy as long as uniqueness of the data element (entity) can be ensured. Versioning can be achieved by versioning strategies, such as normal versioning, time stamps, hashes, etc. Identification and versioning are managed by the source domain of the data element (e.g., creator of the data) and are made available with the data element. Referentiality relates to the ability to track the version as a data element is enriched and/or transformed. For example, as downstream systems add on to an original identifiable and versioned data element, the downstream systems can create identities and versions of their own entities (e.g., their own data elements). The individual entities created by the downstream systems will refer to all data elements that went into the creation of the specific entity. Lineage detection relates to a time and motion analysis of data elements across an ecosystem using entity identification and versioning and referentiality.

Figure 1:
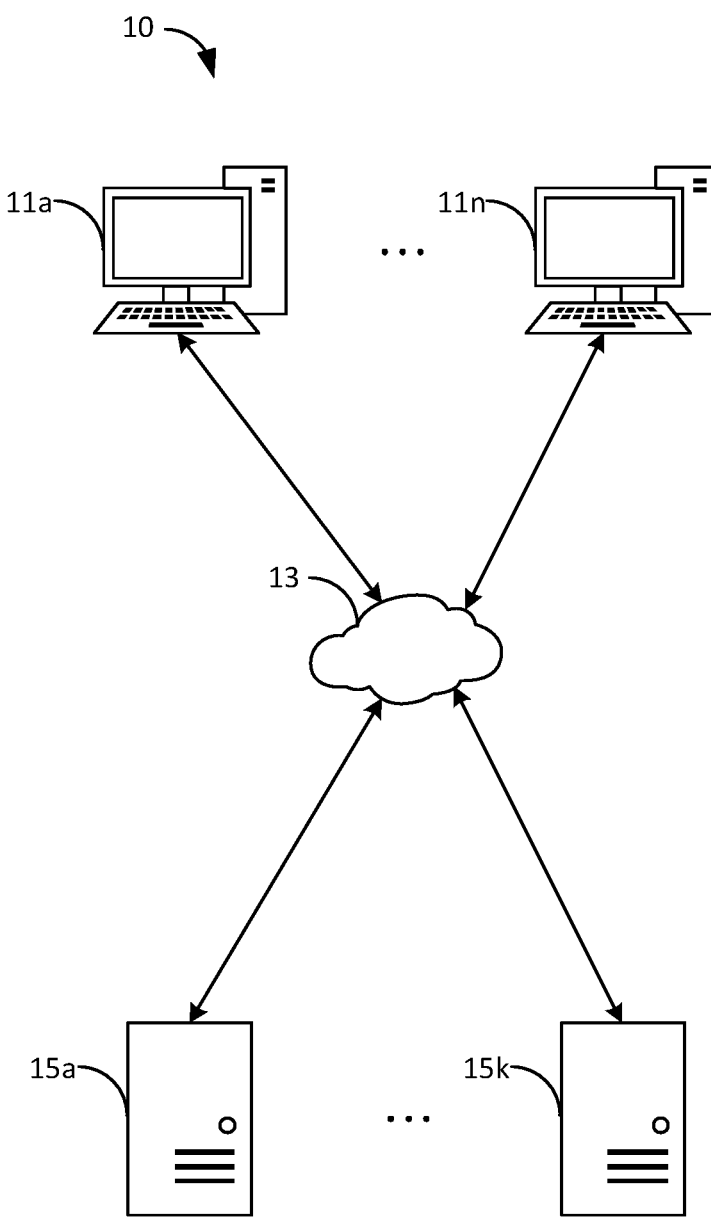
FIG. 1 is a diagram illustrating an example network environment of computing devices in which various aspects of the disclosure may be implemented, in accordance with an embodiment of the present disclosure.

Referring now to FIG. 1, shown is a diagram illustrating an example network environment 10 of computing devices in which various aspects of the disclosure may be implemented, in accordance with an embodiment of the present disclosure. As shown, environment 10 includes one or more client machines 11*a*-11*n* (11 generally), one or more server machines 15*a*-15*k* (15 generally), and one or more networks 13. Client machines 11 can communicate with server machines 15 via networks 13. Generally, in accordance with client-server principles, a client machine 11 requests, via network 13, that a server machine 15 perform a computation or other function, and server machine 15 responsively fulfills the request, optionally returning a result or status indicator in a response to client machine 11 via network 13.

In some embodiments, client machines 11 can communicate with remote machines 15 via one or more intermediary appliances (not shown). The intermediary appliances may be positioned within network 13 or between networks 13. An intermediary appliance may be referred to as a network interface or gateway. In some implementations, the intermediary appliance may operate as an application delivery controller (ADC) in a datacenter to provide client machines (e.g., client machines 11) with access to business applications and other data deployed in the datacenter. The intermediary appliance may provide client machines with access to applications and other data deployed in a cloud computing environment, or delivered as Software as a Service (SaaS) across a range of client devices, and/or provide other functionality such as load balancing, etc.

Client machines 11 may be generally referred to as computing devices 11, client devices 11, client computers 11, clients 11, client nodes 11, endpoints 11, or endpoint nodes 11. Client machines 11 can include, for example, desktop computing devices, laptop computing devices, tablet computing devices, mobile computing devices, workstations, and/or hand-held computing devices. Server machines 15 may also be generally referred to a server farm 15. In some embodiments, a client machine 11 may have the capacity to function as both a client seeking access to resources provided by server machine 15 and as a server machine 15 providing access to hosted resources for other client machines 11.

Server machine 15 may be any server type such as, for example, a file server, an application server, a web server, a proxy server, a virtualization server, a deployment server, a Secure Sockets Layer Virtual Private Network (SSL VPN) server; an active directory server; a cloud server; or a server executing an application acceleration program that provides firewall functionality, application functionality, or load balancing functionality. Server machine 15 may execute, operate, or otherwise provide one or more applications. Non-limiting examples of applications that can be provided include software, a program, executable instructions, a virtual machine, a hypervisor, a web browser, a web-based client, a client-server application, a thin-client, a streaming application, a communication application, or any other set of executable instructions.

In some embodiments, server machine 15 may execute a virtual machine providing, to a user of client machine 11, access to a computing environment. In such embodiments, client machine 11 may be a virtual machine. The virtual machine may be managed by, for example, a hypervisor, a virtual machine manager (VMM), or any other hardware virtualization technique implemented within server machine 15.

Networks 13 may be configured in any combination of wired and wireless networks. Network 13 can be one or more of a local-area network (LAN), a wide area network (WAN), a metropolitan area network (MAN), a virtual private network (VPN), a primary public network, a primary private network, the Internet, or any other type of data network. In some embodiments, at least a portion of the functionality associated with network 13 can be provided by a cellular data network and/or mobile communication network to facilitate communication among mobile devices. For short range communications within a wireless local-area network (WLAN), the protocols may include 802.11, Bluetooth, and Near Field Communication (NFC).

Figure 2:
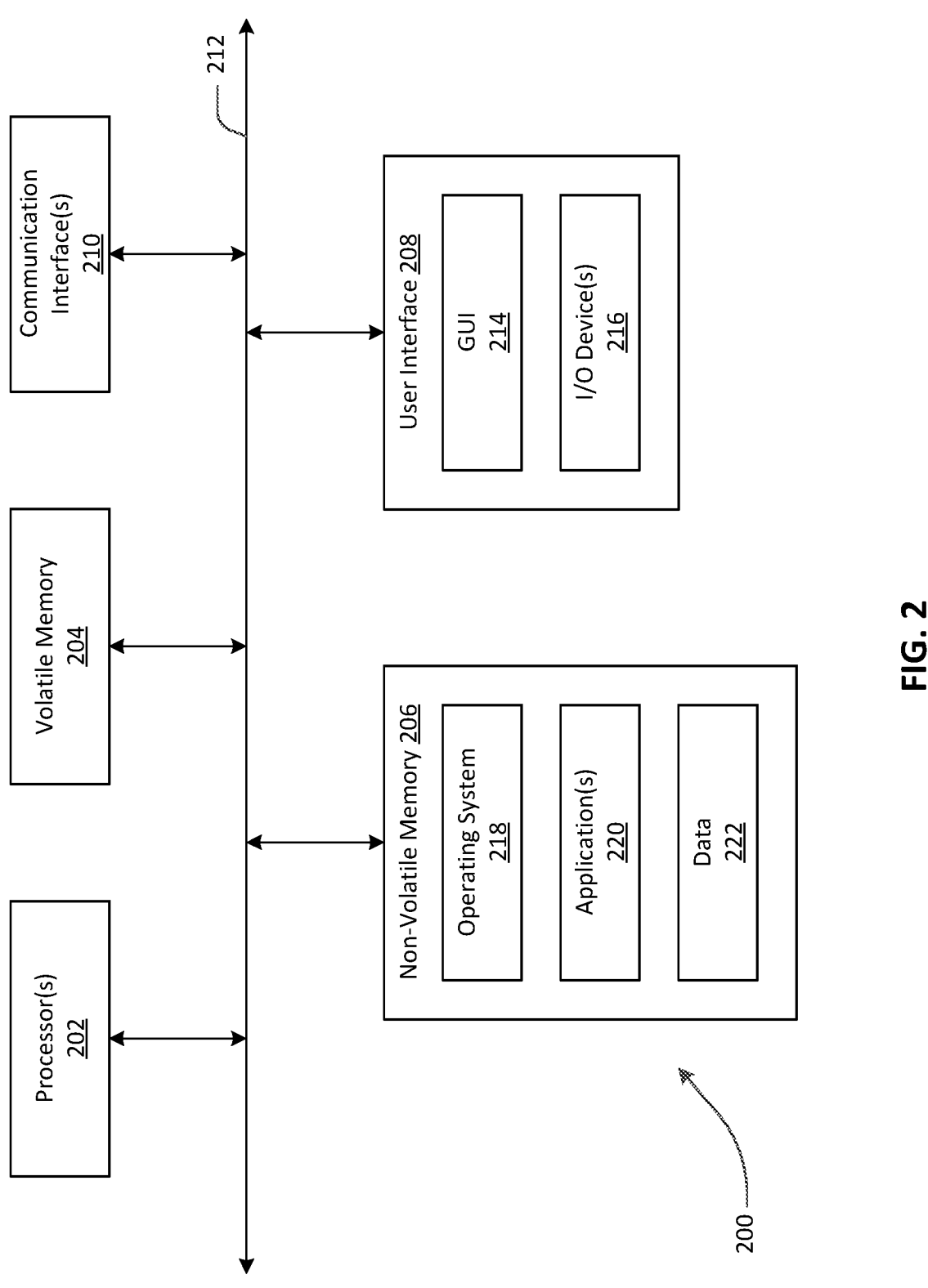
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 200 in which various aspects of the disclosure may be implemented, in accordance with an embodiment of the present disclosure. For instance, client machines 11 and/or server machines 15 of FIG. 1 can be substantially similar to computing device 200. As shown, computing device 200 includes one or more processors 202, a volatile memory 204 (e.g., random access memory (RAM)), a non-volatile memory 206, a user interface (UI) 208, one or more communications interfaces 210, and a communications bus 212.

Non-volatile memory 206 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 208 may include a graphical user interface (GUI) 214 (e.g., a touchscreen, a display, etc.) and one or more input/output (I/O) devices 216 (e.g., a mouse, a keyboard, a microphone, one or more speakers, one or more cameras, one or more biometric scanners, one or more environmental sensors, and one or more accelerometers, etc.).

Non-volatile memory 206 stores an operating system 218, one or more applications 220, and data 222 such that, for example, computer instructions of operating system 218 and/or applications 220 are executed by processor(s) 202 out of volatile memory 204. In one example, computer instructions of operating system 218 and/or applications 220 are executed by processor(s) 202 out of volatile memory 204 to perform all or part of the processes described herein (e.g., processes illustrated and described with reference to FIGS. 4 through 10). In some embodiments, volatile memory 204 may include one or more types of RAM and/or a cache memory that may offer a faster response time than a main memory. Data may be entered using an input device of GUI 214 or received from I/O device(s) 216. Various elements of computing device 200 may communicate via communications bus 212.

The illustrated computing device 200 is shown merely as an illustrative client device or server and may be implemented by any computing or processing environment with any type of machine or set of machines that may have suitable hardware and/or software capable of operating as described herein.

Processor(s) 202 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 202 may be analog, digital or mixed signal. In some embodiments, processor 202 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 210 may include one or more interfaces to enable computing device 200 to access a computer network such as a Local Area Network (LAN), a Wide Area Network (WAN), a Personal Area Network (PAN), or the Internet through a variety of wired and/or wireless connections, including cellular connections.

In described embodiments, computing device 200 may execute an application on behalf of a user of a client device. For example, computing device 200 may execute one or more virtual machines managed by a hypervisor. Each virtual machine may provide an execution session within which applications execute on behalf of a user or a client device, such as a hosted desktop session. Computing device 200 may also execute a terminal services session to provide a hosted desktop environment. Computing device 200 may provide access to a remote computing environment including one or more applications, one or more desktop applications, and one or more desktop sessions in which one or more applications may execute.

Figure 3:
FIG. 3 is a diagram of a cloud computing environment in which various aspects of the concepts described herein may be implemented.
Figure 3:
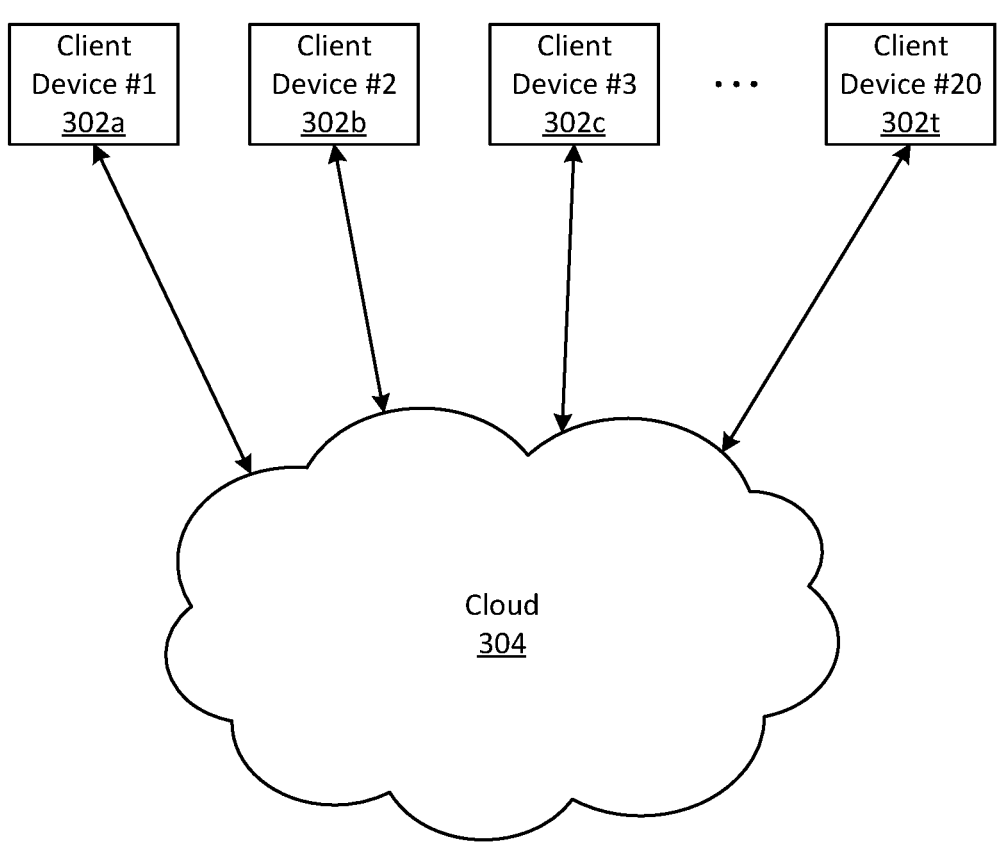

Referring to FIG. 3, shown is a diagram of a cloud computing environment 300 in which various aspects of the concepts described herein may be implemented. Cloud computing environment 300, which may also be referred to as a cloud environment, cloud computing, or cloud network, can provide the delivery of shared computing resources and/or services to one or more users or tenants. For example, the shared resources and services can include, but are not limited to, networks, network bandwidth, servers, processing, memory, storage, applications, virtual machines, databases, software, hardware, analytics, and intelligence.

In cloud computing environment 300, one or more client devices 302a-302t (such as client machines 11 and/or computing device 200 described above) may be in communication with a cloud network 304 (sometimes referred to herein more simply as a cloud 304). Cloud 304 may include back-end platforms such as, for example, servers, storage, server farms, or data centers. The users of clients 302a-302t can correspond to a single organization/tenant or multiple organizations/tenants. More particularly, in one implementation, cloud computing environment 300 may provide a private cloud serving a single organization (e.g., enterprise cloud). In other implementations, cloud computing environment 300 may provide a community or public cloud serving one or more organizations/tenants.

In some embodiments, one or more gateway appliances and/or services may be utilized to provide access to cloud computing resources and virtual sessions. For example, a gateway, implemented in hardware and/or software, may be deployed (e.g., reside) on-premises or on public clouds to provide users with secure access and single sign-on to virtual, SaaS, and web applications. As another example, a secure gateway may be deployed to protect users from web threats.

In some embodiments, cloud computing environment 300 may provide a hybrid cloud that is a combination of a public cloud and a private cloud. Public clouds may include public servers that are maintained by third parties to client devices 302a-302t or the enterprise/tenant. The servers may be located off-site in remote geographical locations or otherwise.

Cloud computing environment 300 can provide resource pooling to serve clients devices 302a-302t (e.g., users of client devices 302a-302n) through a multi-tenant environment or multi-tenant model with different physical and virtual resources dynamically assigned and reassigned responsive to different demands within the respective environment. The multi-tenant environment can include a system or architecture that can provide a single instance of software, an application, or a software application to serve multiple users. In some embodiments, cloud computing environment 300 can include or provide monitoring services to monitor, control, and/or generate reports corresponding to the provided shared resources and/or services.

In some embodiments, cloud computing environment 300 may provide cloud-based delivery of various types of cloud computing services, such as Software as a service (SaaS), Platform as a Service (PaaS), Infrastructure as a Service (IaaS), and/or Desktop as a Service (DaaS), for example. IaaS may refer to a user renting the use of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, or virtualization, as well as additional resources such as, for example, operating systems, middleware, and/or runtime resources. SaaS providers may offer the resources that PaaS provides, including storage, networking, servers, virtualization, operating systems, middleware, or runtime resources. SaaS providers may also offer additional resources such as, for example, data and application resources. DaaS (also known as hosted desktop services) is a form of virtual desktop service in which virtual desktop sessions are typically delivered as a cloud service along with the applications used on the virtual desktop.

Figure 4:
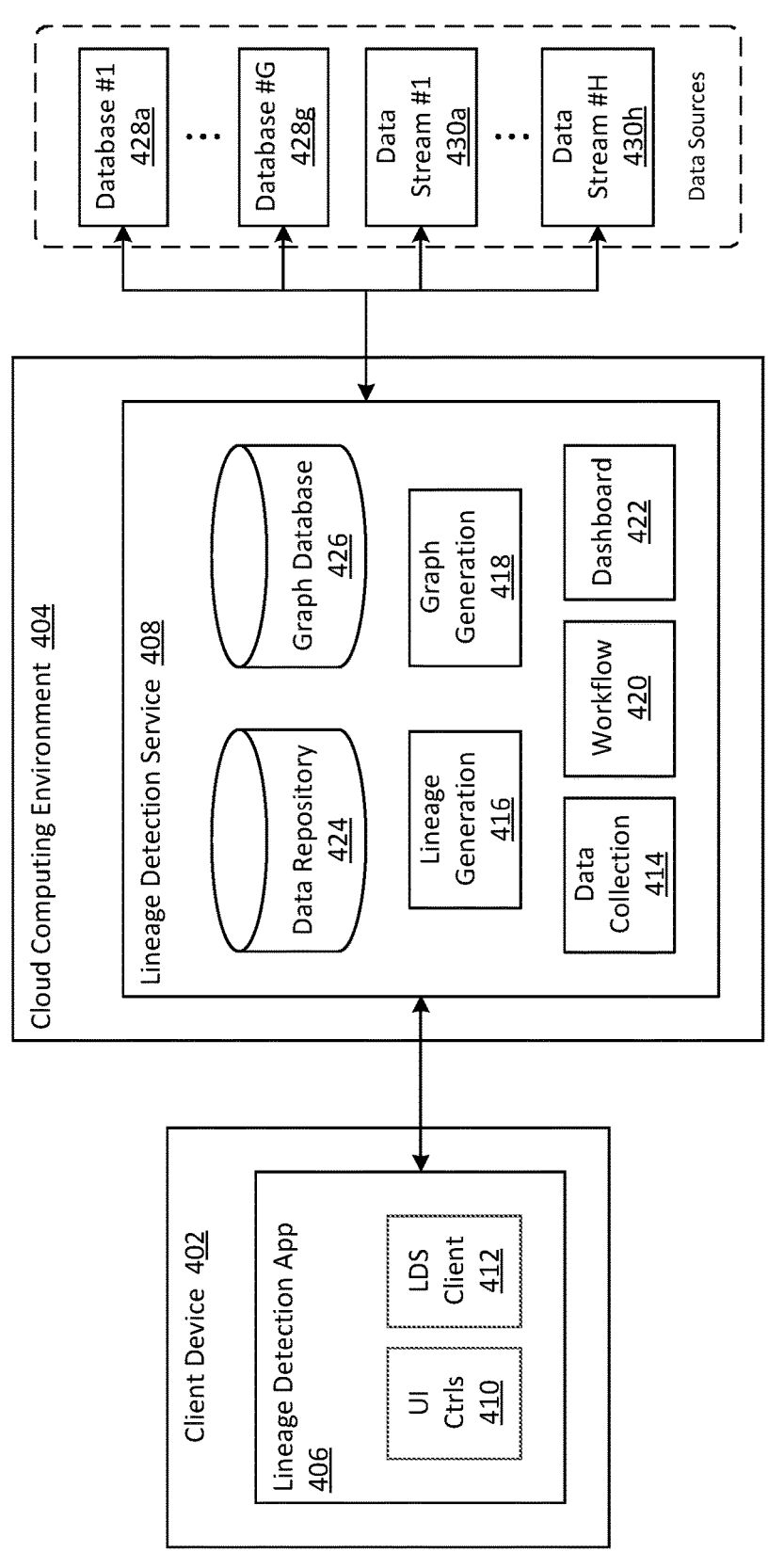
FIG. 4 is a block diagram of an illustrative system for traceability of data changes, in accordance with an embodiment of the present disclosure.

FIG. 4 is a block diagram of an illustrative system 400 for traceability of data changes, in accordance with an embodiment of the present disclosure. Illustrative system 400 includes a lineage detection application 406 configured to run on a client device 402 and configured to communicate with a hosting environment, typically but not limited to a cloud computing environment 404 via one or more computer networks. Client device 402 and cloud computing environment 404 of FIG. 4 can be the same as or similar to client 11 of FIG. 1 and cloud computing environment 300 of FIG. 3, respectively.

As shown in FIG. 4, a lineage detection service 408 can be provided as a service (e.g., a microservice) within cloud computing environment 404. For example, an organization, such as a company, an enterprise, or other entity that manages data may implement and/or utilize lineage detection service 408 to provide traceability of data changes in the organization's ecosystem, as variously disclosed herein. As used herein, the term "data change" refers, in addition to its ordinary meaning, to creation of new data (e.g., newly created data such as an initial version of data) and changes to existing data (e.g., a new version of existing data). As such, a data change is of, or to data (i.e., a data element). In other words, a data change affects a data element. Lineage detection application 406 and lineage detection service 408 can interoperate to provide a user of lineage detection application 406 the ability to trace data changes through their data lineages.

To promote clarity in the drawings, FIG. 4 shows a single lineage detection application 406 communicably coupled to lineage detection service 408. However, embodiments of lineage detection service 408 can be used to service many client applications (e.g., lineage detection applications 406) running on clients (e.g., client devices 402) associated with one or more organizations and/or users. Lineage detection application 406 and/or lineage detection service 408 may be implemented as computer instructions executable to perform the corresponding functions disclosed herein.

Lineage detection application 406 and lineage detection service 408 can be logically and/or physically organized into one or more components. In the example of FIG. 4, lineage detection application 406 includes UI controls 410 and a lineage detection service (LDS) client 412. Also, in this example, lineage detection service 408 includes a data collection module 414, a lineage generation module 416, a graph generation module 418, a workflow module 420, a dashboard 422, a data repository 424, and a graph database or a database capable of storing graph-like data 426.

The client-side lineage detection application 406 can communicate with the cloud-side lineage detection service 408 using an API or other standard modes of communications like feeds, files, or other depending on the security and accessibility of the environment. For example, lineage detection application 406 can utilize LDS client 412 to send requests (or "messages") to lineage detection service 408 wherein the requests are received and processed by one or more components of lineage detection service 408. Likewise, lineage detection service 408 can send responses/messages to lineage detection application 406 wherein the responses/messages are received and processed by LDS client 412 or one or more other components of lineage detection application 406.

Referring to lineage detection service 408, data collection module 414 is operable to receive data elements from various data sources. The data sources may include one or more sources of data, such as, for example, files, databases, and data streams. In general, a data source refers to a location where data can originate from. As shown, in the example of FIG. 4, the data sources can include, for example, one or more databases 428a-428g (individually referred to herein as database 428 or collectively referred to herein as databases 428) and one or more data streams 430a-430h (individually referred to herein as data stream 430 or collectively referred to herein as data streams 430). Databases 428 may correspond to the organization's databases and can include various types of databases such as, for example, Structured Query Language (SQL) databases, NoSQL databases, graph databases, and file systems. Data streams 430 may correspond to data streams (e.g., information, i.e., encoded data elements, transmitted digitally to convey information) within the organization's ecosystem, such as, for example, feeds, notification systems, data streaming technologies (real-time or scheduled), message brokers, etc. The data sources illustrated in FIG. 4 are merely illustrative and the structures and techniques sought to be protected herein can be applied to any number of data sources and/or other types of data sources than those illustrated in FIG. 4.

In some embodiments, tracer agents (not depicted) may be deployed alongside the various data sources and operate to monitor for data changes (e.g., monitor for creation of new data or changes to existing data). For example, a tracer agent deployed alongside a database (e.g., database 428) may be implemented as a database trigger which runs (i.e., executes) when an event occurs in the database, such as, for example, when data is created/modified/deleted in the database. As another example, a tracer agent deployed alongside a database (e.g., database 428) may be implemented as software (e.g., an application) that monitors the change streams from the database for data changes. As another example, a tracer agent deployed alongside a data stream (e.g., data stream 430) may be implemented as a listener to detect (or "listen for") data changes in the data stream. In any case, the tracer agents can introspect data changes and, for a particular data change, collect the identification and versioning of a data element associated with the data change, and the referentiality of the data element. For example, in the case where the data source is a database, the tracer agent can collect the identification and versioning and/or the referentiality information from the metadata about that data element which is created by the database system. In the case where the data source is a data stream, the tracer agent can collect the identification and versioning and/or the referentiality information from the content of the messages (e.g., message header). In some cases, the tracer agent can generate identification and referentiality information on behalf of the data source if not already present using standard techniques like timestamps and hashes of the data. The tracer agent can send or otherwise provide (e.g., route) the collected identification and versioning and/or the referentiality information of a data element (i.e., identification and versioning and/or the referentiality information of a data element affected by the data change) to lineage detection service 408 wherein the sent information is received and processed by data collection module 414. Accordingly, the tracer agents can be understood as being the entry points for data elements into lineage detection service 408.

In some embodiments, a tracer agent can send the identification and versioning information of a data element affected by a data change using a data structure shown in Table 1 below.

TABLE 1

```
{
    "metadata": {
        "id": "101",
        "version": "1",
        "datetime": "8/10/2022:19:07:01.199",
        "type": "part",
        ...
    }
}
```

The illustrative data structure in Table 1 characterizes a data element and includes an "id" attribute that indicates an identifier (e.g., "101") uniquely identifying the data element. The identification of a data element (an entity) can be by any strategy as long as uniqueness of the data element can be ensured. The data structure also includes a "version" attribute that indicates a version (e.g., "1") of the data element. Versioning can be achieved by various versioning strategies, such as normal versioning, time stamps, hashes, etc. The data structure may further include a "datetime" attribute that indicates a date and time (e.g., "Aug. 10, 2022:19:07: 01.199") the data element was created. The data structure may also include other attributes which further characterize the data element. For example, the data structure may include a "type" attribute that indicates a type of data (e.g., "part," "part-content," "part-price," "product," "product-content," "product-price," and "composite," among others) characterized by the data element. For example, the type "part" indicates that the data element characterizes a part (e.g., a constituent piece or component of a product), "part-content" indicates that the data element characterizes content associated with a part (e.g., a description of the part), "part-price" indicates that the data element characterizes a price associated with a part (e.g., a price of the part), "product" indicates that the data element characterizes a product (e.g., an article that is manufactured), "product-content" indicates that the data element characterizes content associated with a product (e.g., a description of the product), "product-price" indicates that the data element characterizes a price associated with a product (e.g., a price of the product), and "composite" indicates that the data element characterizes a collection of data (e.g., a search index containing multiple data elements). The list of types of data is merely illustrative and may vary between different data sources and/or between different organizations.

In some cases, a data element may refer to or consume one or more other data elements. For example, downstream systems can create identities and versions of their own data by adding on to (e.g., enriching, transforming, etc.) data created by upstream systems. When creating such a data element, a downstream system can include with the created data element referentiality information about the other data elements referred to or otherwise consumed by the created data element. In other words, a data element created by a downstream system can include referentiality information identifying the other data elements (e.g., other data elements created by upstream systems) referred to by the data element created by the downstream system. In some embodiments, a tracer agent can send the referentiality information of a data element (i.e., referentiality associated with a data element) using a data structure shown in Table 2 below.

TABLE 2

```
{
    "metadata":
        "id": "uxw203fl".
        "version": "10",
        "datetime": "8/10/2022:10:23:7.203",
        "type": "product",
        "References": [
            {
                "id": "101".
                "version": "1",
                "type": "part",
            },
            {
                "id": "110".
                "version": "1",
                "type": "part",
            }
        ]
    },
    "name": "XPS laptop 15",
    "color": "silver",
    "processor": "intel core processor - i5",
    "display": "touch"
}
```

Similar to the data structure illustrated in Table 1 above, the illustrative data structure in Table 2 characterizes a data element. In the illustrated data structure, an "id" attribute indicates an identifier (e.g., "uxw203fl") that uniquely identifies the data element. The data structure also includes a "version" attribute that indicates a version (e.g., "10") of the data element. The data structure may further include a "datetime" attribute that indicates a date and time (e.g., "Aug. 10, 2022:10:23:37.203") the data element was created, and a "type" attribute that indicates a type of data (e.g., "product") characterized by the data element. In the example illustrated in Table 2, the data element corresponds to a product having an identifier "uxw203fl" and version "10," which was created on date "Aug. 10, 2022" and time "10:23:37.203." Within the data structure, a "References" attribute defines the referentiality information. In the illustrated data structure in Table 2, the References attribute includes referentiality information indicating that two data elements are referred to by the data element identified by the unique identifier "uxw203fl" and version "10." More particularly, the referentiality information indicates that the data element identified by unique identifier "uxw203fl" and version "10" refers to a data element identified by the unique identifier "101" and version "1" and a data element identified by the unique identifier "110" and version "1." In other words, the referentiality information of the data element identified by unique identifier "uxw203fl" and version "10" indicates that this data element consumes a data element identified by the unique identifier "101" and version "1" and a data element identified by the unique identifier "110" and version "1." Thus, for a particular data element included in the referentiality information, the referentiality information indicates or otherwise provides information about the lineage of the data element with regard to the consuming data element. In some embodiments, the referentiality information may also include a type attribute for each data element that indicates the type of data characterized by the data element. In the example of Table 2, the type attribute included in the referentiality information indicates that the data element identified by the unique identifier "101" and version "1" and the data element identified by the unique identifier "110" and version "1" both correspond to parts.

In response to lineage detection service 408 receiving the identification and versioning and/or referentiality information of a data element from a tracer agent, data collection module 414 can store the received information within data repository 424, where it can subsequently be retrieved and used. In some embodiments, data repository 424 may correspond to a structured database such as a relational database management system. Non-limiting examples of relational management systems include MYSQL, POSTGRESQL, ORACLE DB, and MS SQLSERVER. In some embodiments, data repository 424 may correspond to a storage service within the computing environment of lineage detection service 408 (e.g., within cloud computing environment 404).

Lineage generation module 416 is operable to generate (or "build") data lineages of data elements. In some implementations, lineage generation module 416 can be operated immediately after identification and versioning and/or referentiality information has been stored into data repository 424 or on a schedule to process all received information after the last operation. For example, in one implementation, when a data change is detected (e.g., lineage detection service 408 receives the identification and versioning and/or referentiality information of a data element is received by lineage detection service 408), lineage generation module 416 can retrieve the identification and versioning and/or referentiality information of the affected data element from data repository 424 and generate a data lineage of the data element. More particularly, lineage generation module 416 can parse or otherwise analyze the referentiality information of the data element to identify other data elements (e.g., upstream data elements) that are related to the data element. Lineage generation module 416 can then generate a data lineage that indicates the relationships between the data element and the identified upstream data elements. That is, a generated data lineage can include metadata that traces the flow of an upstream data element to downstream or consuming data element(s).

In some embodiments, lineage generation module 416 can update an existing or previously generated data lineage. The existing data lineage may be retrieved from a data repository (e.g., data repository 424). For instance, in the case where a data element affected by the data change is a later version of or an update to an existing data element, lineage generation module 416 can identify a data lineage of the existing data element and update the data lineage of the existing data element to include or otherwise reflect the data change. In some cases, updating the data lineage may include replacing an older version of a data element in the data lineage with a newer version of the data element.

In some embodiments, lineage generation module 416 can maintain information about the data lineages of data elements (also referred to herein as "data lineage information") in structured tables such as, for example, a structured table 500 illustrated in FIG. 5. The data lineage information stored within illustrative table 500 shows a time and motion analysis (or "data flow") of a data element as it flows to one or more downstream data elements. Lineage generation module 416 can store the data lineage information (e.g., the structured data lineage information in structured table 500) within data repository 424.

In the example of table 500, the time and motion analysis is of a data element corresponding to a part ("Part") as the part flows to downstream data elements which include a part content ("Part content"), a part price ("Part price"), a product ("Product"), a product content ("Product content"), a product price ("Product price"), and a composite ("Composite"). In table 500, each row (or "entry" or "record") can correspond to a data element (e.g., part, part content, part price, product, product content, product price, and composite), sequence ("Sequence") can indicate an order of the data flow, and timestamp ("Timestamp") can indicate a date and time the data element was created. In this example, the data lineage is of a data element corresponding to a part ("id: 101; version: 1") that is created on 2022 Aug. 11 at about 01:31:56 as indicated by the information in the first row of table 500. This part data element is referred to by a downstream data element corresponding to a part content ("id:c1; version: 1") that is created on 2022 Aug. 11 at about 01:50:33 as indicated by the information ("References: {part, id: 101, version: 1}") in the second row of table 500. The part data element is also referred to by a downstream data element corresponding to a part price ("id:p1; version: 1") that is created on 2022 Aug. 11 at about 02:15:01 as indicated by the information ("References: {part, id: 101, version: 1}") in the third row of table 500. The part data element is also referred to by a downstream data element corresponding to a product ("id:uxw203fl; version: 10") that is created on 2022 Aug. 14 at about 11:15:16 as indicated by the information ("References: {part, id: 101, version: 1; . . . }") in the fourth row of table 500. The product data element also refers to a part price data element as indicated by the information ("References: { . . . part-price, id:p1, version: 1}") in the fourth row of table 500.

Continuing the example of FIG. 5, the product part data element is referred to by a downstream data element corresponding to a product content ("id:prodc1; version: 11") that is created on 2022 Aug. 11 at about 01:50:33 as indicated by the information ("References: {product-part, id:uxw203fl, version: 10}") in the sixth row of table 500. The product part data element is also referred to by a downstream data element corresponding to a product price ("id:prodp1; version:8") that is created on 2022 Aug. 11 at about 02:15:01 as indicated by the information ("References: {product-part, id:uxw203fl, version: 10}") in the seventh row of table 500. The product part data element, the product price data element, and the product content data element are referred to by a downstream data element corresponding to the composite ("id:compuxw203fl; version:25") that is created on 2022

Aug. 14 at about 11:15:16 as indicated by the information ("References: [{product-part, id:uxw203fl, version: 10}, {product-price, id:prodp1, version:8}, {product-content, id:prodc1, version: 11}]") in the eighth row of table 500. The information in table 500 is indicative of the data flow of the part data element ("id: 101; version: 1") to downstream data elements and can be used to identify the downstream data elements that refer to the part data element. For example, when the part data element is later updated or revised (e.g., an update or a later version of the part data element is created), table 500 can be used to identify downstream data elements which may need to be updated because of the update or revision to the part data element.

In some embodiments, lineage generation module 416 can generate lineage templates for data elements. Lineage generation module 416 can generate the lineage templates based on the data lineages of the data elements (e.g., based on the data lineage information about the data elements) as observed over a period. For a given data element, a lineage template can define a data lineage of the data element, including one or more actions the data element goes through to complete its data lineage, and the timeliness for each action. The actions specified in a lineage template can be understood as defining a workflow for the data element to complete its data lineage. For instance, when a change to a data element is detected, the template for the data element can be used as a workflow for the data element to complete the data change in the data lineage of the data element. As the data processes evolve over a period, the template will be updated. This template is a live representation of the data lineage over a period. The period of time itself can be configured to set time periods, which can be used when processes change and can also be customized by the organization or the user. Lineage generation module 416 can store the lineage templates within data repository 424.

FIG. 6 is a diagram illustrating an example lineage template 600 for a data element, in accordance with an embodiment of the present disclosure. Illustrated lineage template 600 includes rows 602-610. Each of rows 602-610 in lineage template 600 records the individual relations in the template. As can be seen in FIG. 6, the information maintained for each row 602-610 can include Lineage, Step, Order, Mean, Min, Max, Alert Timeout, and Optional. The attributes of lineage are derived from the data sources as observed over a period. In general, a lineage template (e.g., lineage template 600) provides for data producers and data consumers to indicate creation, completion, and status of actions (or "data tasks") using identification, versioning, and referentiality. More specifically, referentiality provides a mechanism with which a system can indicate what a certain data is based upon (e.g., when a certain data is created, referentiality allows for indicating what input data was used in its creation).

In the example of FIG. 6, Lineage can uniquely identify a data element within system 400. Lineage is the first step in a workflow. For example, Lineage can include an identifier that uniquely identifies the data element (e.g., Part A) of the lineage template. The data entry and its identifier, being the first and causative data element in lineage template 600, can be used as the identifier for the whole lineage template 600. In the example of FIG. 6, lineage template 600 defines a data lineage of the data element identified by the unique identifier Part A. Step can refer to the individual actions (e.g., creation of a Part-Content data element, Part-Price data element, Product-Part data element, Product-Content data element, and Product-Price element) in the workflow for the data element (e.g., Part A) to complete its data lineage. Step is derived from all the data changes that consumes Part A as indicated by its referentiality. Order can include a value that indicates the sequencing (e.g., 1, 2, 3, etc.) of the indicated Steps in the data lineage (e.g., indicates a sequence of the Steps). Order is derived based on the timing of individual steps as observed over a period as well as if a certain step uses other steps as described by its referentiality. In a lineage template, multiple Steps can have the same Order value if they have the same number of steps in its referentiality and occurs at relatively the same time.

Mean, Min, and Max are derived from the time it takes for a given step to happen over a period of time. Mean can include a value that indicates an average time (e.g., number of seconds) taken to perform the given Step (e.g., creation of the downstream data element in the data lineage) post or subsequent the previous Step in the data lineage. Min can include a value that indicates a minimum time (e.g., number of seconds) taken to perform the given Step post or subsequent the previous Step in the data lineage. Max can include a value that indicates a maximum time (e.g., number of seconds) taken to perform the given Step post or subsequent the previous Step in the data lineage. Alert Timeout can include a value that indicates a time (e.g., number of seconds) post or subsequent the Mean time recorded for this the given Step to generate an alert if the given Step is not performed. This is computed by the system using min, max and mean values. This can also be customized by a human user. Optionality includes a value (e.g., y=yes; n=no) that indicates whether the given Step is optional in the data lineage.

In the illustrated lineage template 600 of data element Part A shown in FIG. 6, row 602 indicates that the creation of a Part-Content data element is an action in the workflow for data element Part A, and that the sequencing of the creation of the Part-Content data element in the data lineage is 1. Row 602 also indicates a Mean time of 7721 seconds taken to create the Part-Content data element post the previous Step (e.g., post detection of a data change of the Part A data element). Row 602 also indicates a Min time of 1173 seconds and a Max time of 12391 seconds taken to create the Part-Content data element post the previous Step. Thus, in the illustrated lineage template 600, row 602 indicates that it takes an average time of 7,721 seconds, a minimum time of 1,173 seconds, and a maximum time of 12,391 seconds to create the Part-Content data element once the data change of the Part A data element is detected. Row 602 also indicates an Alert Timeout of 14400 seconds, which means to generate an alert if the Part-Content data element is not created even after passage of 14400 seconds after the Mean time (e.g., 7721 seconds) recorded for this action. Row 602 further indicates that creation of the Part-Content data element is not optional in the workflow for data element Part A.

Row 604 indicates that the creation of a Part-Price data element is an action in the workflow for data element Part A, and that the sequencing of the creation of the Part-Price data element in the data lineage is 1. Row 604 also indicates a Mean time of 10239 seconds taken to create the Part-Price data element post the previous Step (e.g., detection of the data change of the Part A data element). Note that the previous Step is not the creation of the Part-Content data element (i.e., row 602) since the sequencing of the creation of the Part-Price data element in the data lineage is 1 (i.e., the same as the sequencing of the creation of the Part-Content data element). Order is derived based on the timing of individual steps as observed over a period as well as if a certain step uses other steps as described by its referentiality. In this case both part-content and part-price elements uses part, product-part uses part and part-price thus its order is 2. Product-content element uses part, part-content, and product. Row 604 also indicates a Min time of 6201 seconds and a Max time of 21578 seconds taken to create the Part-Price data element post the previous Step. Thus, in the illustrated lineage template 600, row 604 indicates that it takes an average time of 10,239 seconds, a minimum time of 6,201 seconds, and a maximum time of 21,578 seconds to create the Part-Price data element once the data change of the Part A data element is detected. Row 604 also indicates an Alert Timeout of 30000 seconds, which means to generate an alert if the Part-Price data element is not created even after passage of 30000 seconds after the Mean time (e.g., 10239 seconds) recorded for this action. Row 604 further indicates that the creation of the Part-Price data element is not optional in the workflow for data element Part A.

With continued reference to illustrative lineage template 600, row 606 indicates that the creation of a Product-Part data element is an action in the workflow for data element Part A, and that the sequencing of the creation of the Product-Part data element in the data lineage is 2. Row 606 also indicates a Mean time of 1267 seconds taken to create the Product-Part data element post the previous Step. Note that the creation of the Part-Price data element is the previous Step since row 606 follows row 604 in lineage template 600. Row 606 also indicates a Min time of 366 seconds and a Max time of 3656 seconds taken to create the Product-Part data element post the previous Step. Thus, in the illustrated lineage template 600, row 606 indicates that it takes an average time of 1,267 seconds, a minimum time of 366 seconds, and a maximum time of 3,656 seconds to create the Product-Part data element once the Part-Price data element is created. Row 606 also indicates an Alert Timeout of 6000, which means to generate an alert if the Product-Part data element is not created even after passage of 6000 seconds after the Mean time (e.g., 1267 seconds) recorded for this action. Row 606 further indicates that the creation of the Product-Part data element is not optional in the workflow for data element Part A.

Row 608 indicates that the creation of a Product-Content data element is an action in the workflow for data element Part A, and that the sequencing of the creation of the Product-Content data element in the data lineage is 3. Row 608 also indicates a Mean time of 8982 seconds taken to create the Product-Content data element post the previous Step. Note that the creation of the Product-Part data element is the previous Step since row 608 follows row 606 in lineage template 600. Row 608 also indicates a Min time of 1120 seconds and a Max time of 12452 seconds taken to create the Product-Content data element post the previous Step. Thus, in the illustrated lineage template 600, row 608 indicates that it takes an average time of 8,982 seconds, a minimum time of 1,120 seconds, and a maximum time of 12,452 seconds to create the Product-Content data element once the Product-Part data element is created. Row 608 also indicates an Alert Timeout of 24000 seconds, which means to generate an alert if the Product-Content data element is not created even after passage of 24000 seconds after the Mean time (e.g., 8982 seconds) recorded for this action. Row 608 further indicates that the creation of the Product-Content data element is optional in the workflow for data element Part A.

Row 610 indicates that the creation of a Product-Price data element is an action in the workflow for data element Part A, and that the sequencing of the creation of the Product-Price data element in the data lineage is 3. Row 610 also indicates a Mean time of 12394 seconds taken to create the Product-Price data element post the previous Step. Note that the creation of the Product-Content data element is the previous Step since row 610 follows row 608 in lineage template 600. Row 610 also indicates a Min time of 7453 seconds and a Max time of 20293 seconds taken to create the Product-Price data element post the previous Step. Thus, in the illustrated lineage template 600, row 610 indicates that it takes an average time of 12,394 seconds, a minimum time of 7,453 seconds, and a maximum time of 20,293 seconds to create the Product-Price data element once the Product-Content data element is created. Row 610 also indicates an Alert Timeout of 30000 seconds, which means to generate an alert if the Product-Price data element is not created even after passage of 30000 seconds after the Mean time (e.g., 12394 seconds) recorded for this action. Row 610 further indicates that the creation of the Product-Price data element is optional in the workflow for data element Part A.

It should be understood that the lineage template shown in FIG. 6 is merely a simple example and that, in practice, a lineage template generated according to embodiments of the present disclosure may include a different number and/or a large number of Steps.

Referring again to FIG. 4, graph generation module 418 can convert or transform the structured data lineage information stored within data repository 424 into a format suitable for storage in graph database 426 or other databases that can store graph like data. Graph database 426 can be provided as any type of database and/or datastore capable of storing unstructured data objects (e.g., objects having arbitrary formats and attributes) and relationships between such objects, and of efficiently querying stored objects and relationships. Within graph database 426, data objects may be treated as nodes of a data element lineage graph (sometimes referred to herein more simply as "lineage graph") and relationships between data objects may be treated as edges (or "vertices") of the lineage graph. In this way, the lineage graph data stored in graph database 426 can be readily used to generate and/or render lineage graphs (e.g., visual lineage graphs) of data elements. In some cases, the lineage graphs may be displayed on client devices (e.g., on client device 402). In some embodiments, graph database 426 may be provided as a triplestore, meaning a database that stores arbitrary data objects and relationships as 3-tuples or "triples" (in contrast to relational databases where data is stored within defined structured tables having a predefined set of attributes). Further description of lineage graphs is provided below in the context of FIGS. 7-9.

Workflow module 420 is operable to keep track of data changes in the system (e.g., system 400) and the completion of data lineages of data elements affected by the data changes to include the data changes. In some embodiments, workflow module 420 can leverage the lineage templates and the lineage graph to keep track of the data changes in the system and completion of the data lineages. As described previously, a lineage template for a data element defines a workflow for the data element to complete its data lineage. In some embodiments, for a particular data change, workflow module 420 can identify a lineage template (e.g., an existing lineage template) generated for the data element affected by the data change and, using the lineage graph, monitor performance of the workflow for the data element to complete its data lineage. That is, workflow module 420 can use the lineage graph to track performance of the workflow (e.g., track performance of the sequence of actions defined by the workflow). For example, for a given action in a workflow for a data element, workflow module 420 can traverse or otherwise analyze the lineage graph to determine whether the action has been performed (e.g., determine whether the lineage graph includes or reflects the performance of the action).

In some embodiments, workflow module 420 can generate alerts to inform of conditions in the performance of the workflows. Non-limiting examples of such conditions include state of the performance of the workflow (e.g., started, in process, halted, waiting, completed, etc.), reminder to perform an action in a workflow, and non-performance of an action in a workflow. In the example of non-performance of an action in a workflow, workflow module 420 can make this determination based on the sequence of actions and the mean and alert timeout times recorded for the action in the lineage template. For example, suppose an action in a workflow is to create a product-part data element, the recorded mean time and alert timeout time for this action in the lineage template are 2,000 seconds and 5,000 seconds, respectfully, and the previous action in the workflow is to create a product data element. In this example, workflow module 420 can generate an alert informing of the non-performance of the action to create the product-part data element if the product-part data element has not been created even after passage of the alert time out of 5,000 seconds. After the mean time of 2,000 seconds recorded for this action, anyone accessing the dashboard will be able to see that the action has not been performed within the usual time period.

The alerts generated by workflow module 420 may be in various forms, such as, for example, emails, text messages, and phone calls. For example, upon detecting a condition in the performance of a workflow, workflow module 420 can send an email to a user responsible for or tasked with performing the workflow informing of the detected condition. In some embodiments, workflow module 420 can display the alerts and/or cause the alerts to be displayed on a system dashboard (e.g., dashboard 422) of lineage detection service 408.

Turning to client device 402, lineage detection application 406 can include various UI controls that enable a user, such as an administrator or other associate within or associated with an organization, to access and interact with lineage detection service 408. For example, UI controls 410 can include buttons or other controls for accessing and displaying dashboard 422 of lineage detection service 408. In response to the user clicking/tapping on such a button/control, lineage detection application 406 can send a message to lineage detection service 408 requesting access to dashboard 422. In response, lineage detection service 408 can send dashboard 422 to lineage detection application 406 for display on client device 402 (e.g., for display via a UI of lineage detection application 406 on client device 402). The user may then use dashboard 422, for example, to request and view information about the current state of data changes in the ecosystem. For example, dashboard 422 may provide a control (e.g., UI control 410) for accessing and displaying data lineage information. As another example, dashboard 422 may provide a control (e.g., UI control 410) for accessing and displaying workflows in action. As still another example, dashboard 422 may provide a control (e.g., UI control 410) for accessing and displaying lineage graphs. As another example, dashboard 422 may provide a control (e.g., UI control 410) for accessing and displaying system log data, including alerts. As yet another example, dashboard 422 may provide a mechanism to customize the lineage graph or template by updating any of the various aspects in it, or even creating one ground up.

In the embodiment of FIG. 4, lineage detection application 406 is shown as a stand-alone client application. In other embodiments, lineage detection application 406 may be implemented as a plug-in or extension to another application (e.g., a web browser) on client device 402. For example, lineage detection application 406 may be implemented as an extension to an enterprise client application. In such embodiments, UI controls 410 may be accessed within the other application in which lineage detection application 406 is implemented (e.g., accessed within the enterprise client application).

Figure 7:
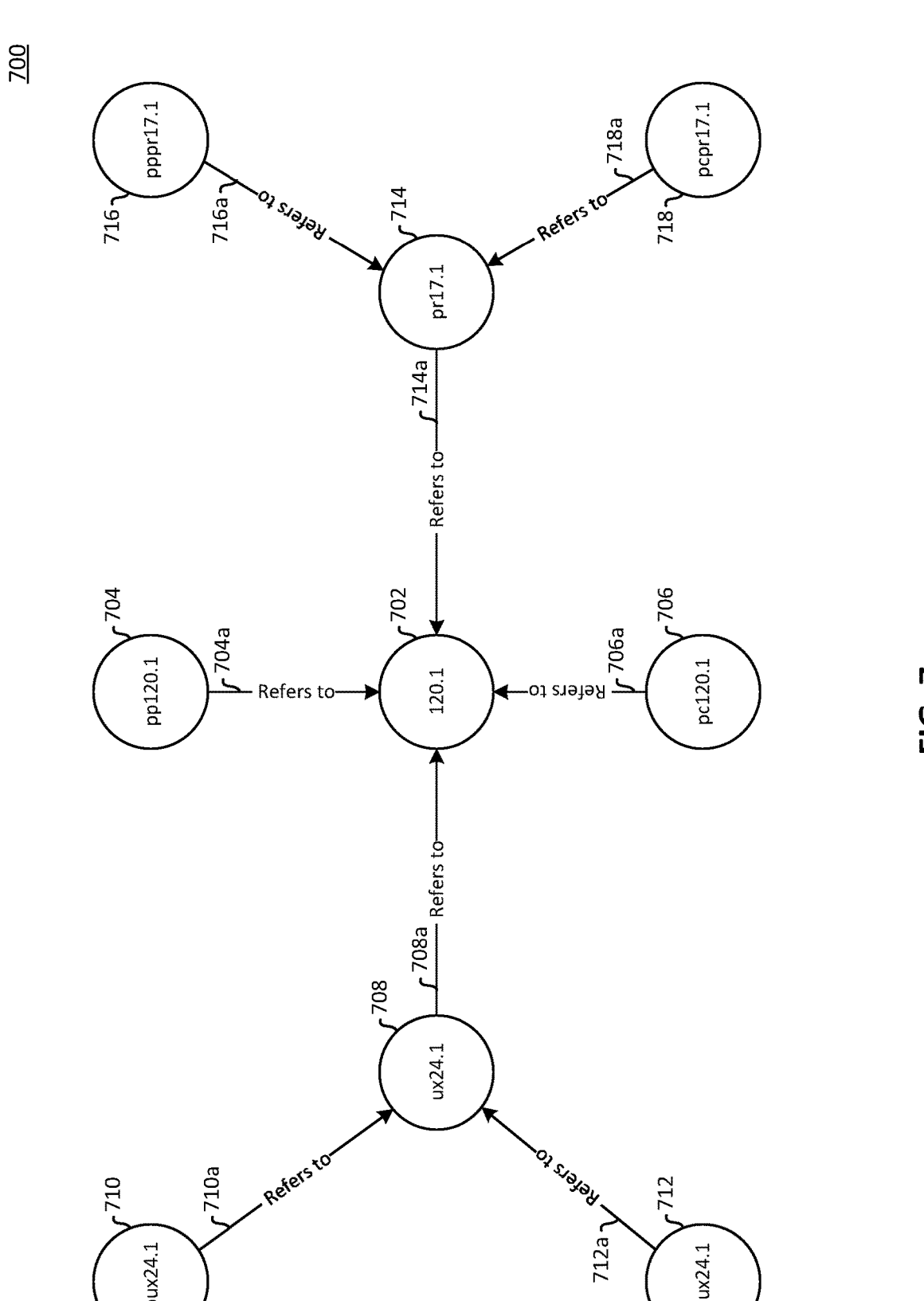
FIG. 7 is a diagram illustrating a portion of a lineage graph that can be generated from data lineage information, in accordance with an embodiment of the present disclosure.

FIG. 7 is a diagram illustrating a portion of a lineage graph 700 that can be generated from data lineage information, in accordance with an embodiment of the present disclosure. For example, with continued reference to FIG. 4, illustrative lineage graph 700 may be generated by graph generation module 418—based on structured data lineage information retrieved from data repository 424—and then stored in graph database 426. As shown, nodes (e.g., circles) 702, 704, 706, 708, 710, 712, 714, 716, 718 may correspond to data elements and directed edges (e.g., directed lines) 704a, 706a, 708a, 710a, 712a, 714a, 716a, 718a may correspond to relationships between the nodes connected by the directed edges, within lineage graph 700. In some embodiments, the directed edges may have labels which provide further indication of how the connected nodes are related to each other. For example, a direct edge from a first node to a second node may have a label which indicates that the first node refers to the second node. As another example, a directed edge from a first node to a second node may have a label which indicates that the first node replaces the second node. Illustrative lineage graph 700 tracks the lineage of data elements and can be used (e.g., traversed) to keep track of changes to data elements, including the completion of data lineages of data elements affected by the data changes.

In the example of FIG. 7, node 702 may correspond to a part having id: 120 and version: 1 ("120.1"), node 704 may correspond to a part-price having id:pp120 and version: 1 ("pp120.1"), node 706 may correspond to a part-content having id:pc120 and version:1 ("pc120.1"), node 708 may correspond to a product having id:ux24 and version: 1 ("ux24.1"), node 710 may correspond to a product-price having id:ppux24 and version: 1 ("ppux24.1"), node 712 may correspond to a product-content having id:pcux24 and version: 1 ("pcux24.1"), node 714 may correspond to a product having id:pr17 and version: 1 ("pr17.1"), node 716 may correspond to a product-price having id:pppr17 and version: 1 ("pppr17.1"), and node 718 may correspond to a product-content having id:pcpr17 and version: 1 ("pcpr17.1"). Part-price node 704 is connected to part node 702 by directed edge 704a labeled "Refers to," indicating that the part-price data element refers to the part data element. Similarly, part-content node 706 is connected to part node 702 by directed edge 706a labeled "Refers to," indicating that the part-content data element refers to the part data element. Product node 708 is also connected to part node 702 by directed edge 708a labeled "Refers to," indicating that the product data element refers to the part data element, and product node 714 is also connected to part node 702 by directed edge 714a labeled "Refers to," indicating that the product data element refers to the part data element.

Still referring to illustrative lineage graph 700, product-price node 710 is connected to product node 708 by directed edge 710a labeled "Refers to," indicating that the product-price data element refers to the product data element. Similarly, product-content node 712 is connected to product node 708 by directed edge 712a labeled "Refers to," indicating that the product-content data element refers to the product data element. Product-price node 716 is connected to product node 714 by directed edge 716a labeled "Refers to," indicating that the product-price data element refers to the product data element. Similarly, product-content node 718 is connected to product node 714 by directed edge 718a labeled "Refers to," indicating that the product-content data element refers to the product data element.

In some embodiments, nodes corresponding to different types of data (e.g., different types of data elements) may be rendered using different visual styles. For example, node 702 corresponding to a part may be rendered in a certain color and nodes 708, 714 corresponding to products may be rendered in a different color.

Figure 8:
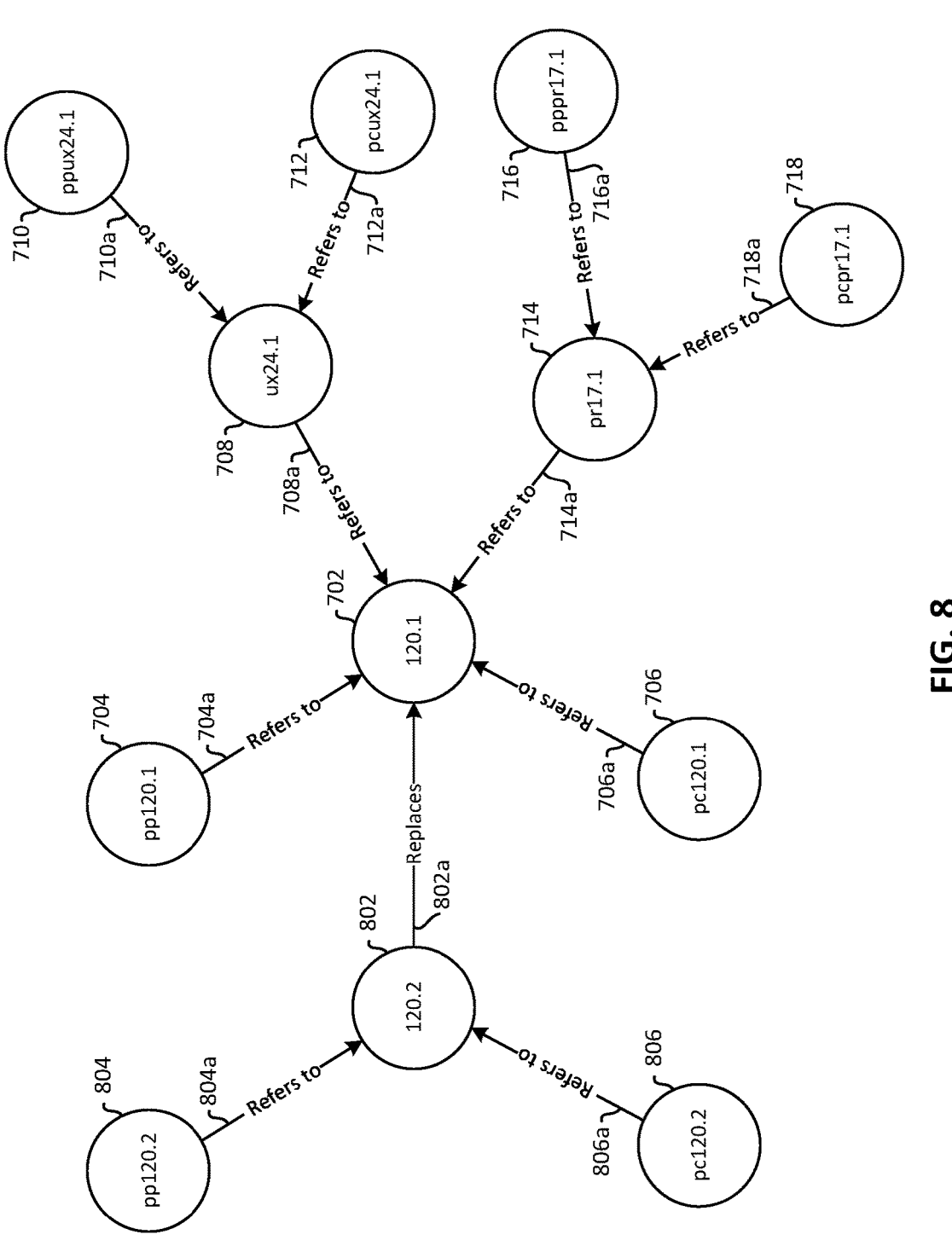
FIG. 8 is a diagram illustrating a portion of a lineage graph showing a partially completed workflow for a new version of a data element, in accordance with an embodiment of the present disclosure.

Turning to FIG. 8 with continued reference to FIG. 7, shown is a diagram of portion of a lineage graph 800 showing a partially completed workflow for a new version of a data element, in accordance with an embodiment of the present disclosure. In FIG. 8, like elements of lineage graph 700 of FIG. 7 are shown using like reference designators. As such, the previous relevant discussion with respect to features of the like elements shown using like reference designators is equally applicable here.

For example, when a new version (e.g., version 2) of the part having id: 120 is created, the workflow for the part may be performed to complete the part's data lineage. As shown in FIG. 8, in addition to nodes 702, 704, 706, 708, 710, 712, 714, 716, 718 and directed edges 704a, 706a, 708a, 710a, 712a, 714a, 716a, 718a, lineage graph 800 also includes nodes 802, 804, 806 and directed edges 802a, 804a, 806a. Node 802 may correspond to the new version, version:2, of the part having id: 120 ("120.2"), node 804 may correspond to a part-price having id:pp120 and version:2 ("pp120.2"), and node 806 may correspond to a part-content having id:pc120 and version:2 ("pc120.2"). Part-price node 804 is connected to part node 802 by directed edge 804a labeled "Refers to," indicating that the part-price data element refers to the new version of the part data element. Part-content node 806 is connected to part node 802 by directed edge 806a labeled "Refers to," indicating that the part-content data element refers to the new version of the part data element. However, part node 802 is connected to part node 702 by directed edge 802a labeled "Replaces," indicating that the new version of the part data element replaces (i.e., is to replace) the part data element (e.g., older version of the part data element). Further, product-nodes 708, 714 are still connected to part node 702, indicating that the products still refer to the old version (i.e., version 1) of the part. Thus, as illustrated in lineage graph 800, the workflow is partially completed with only the part-price (i.e., node 804) and the part-content (i.e., node 806) being updated with the new version of the part (i.e., node 802) as indicated by directed edges 802a, 804a, 806a and their respective labels.

Figure 9:
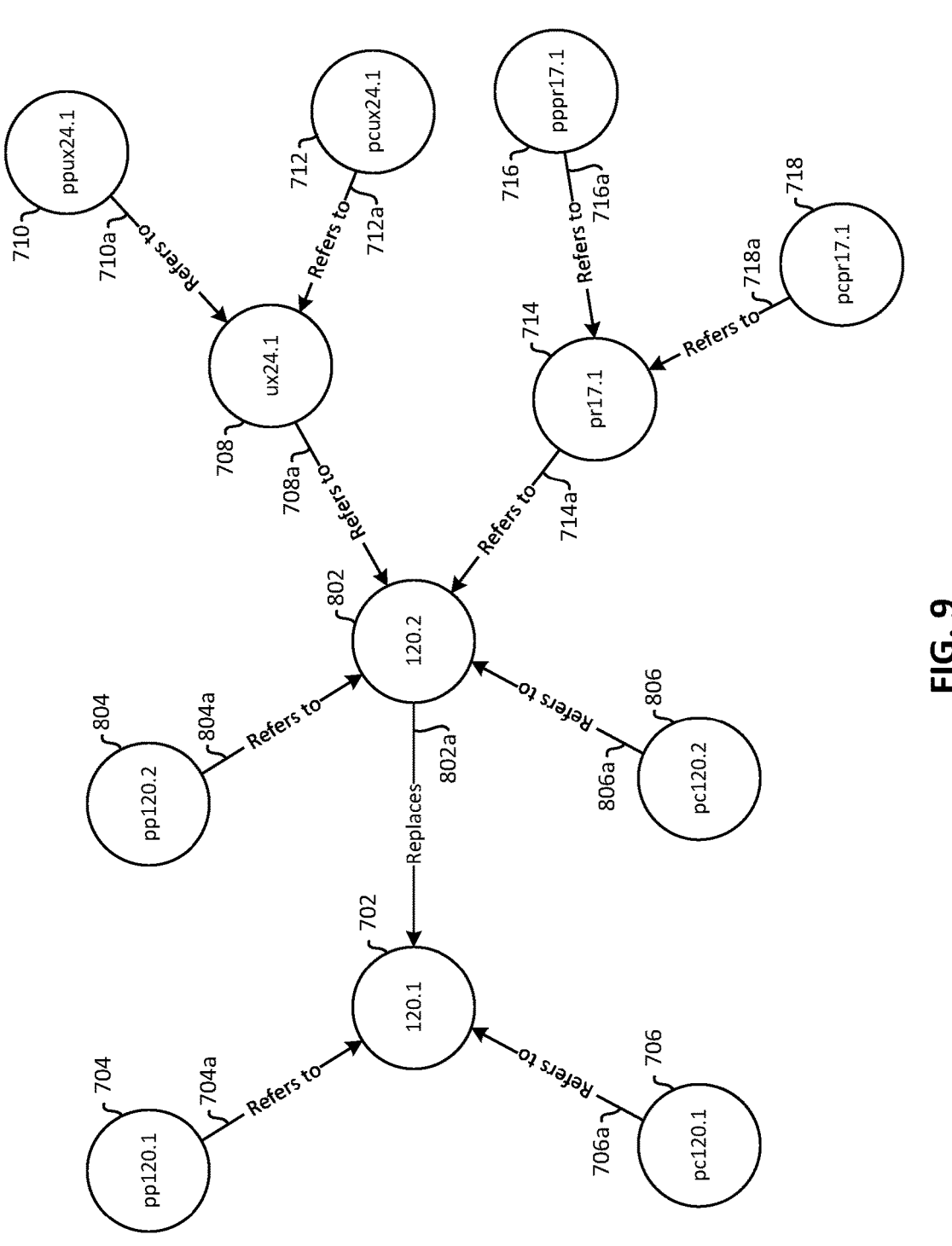
FIG. 9 is a diagram illustrating a portion of a lineage graph showing a completed workflow for a new version of a data element, in accordance with an embodiment of the present disclosure.

Turning to FIG. 9 with continued reference to FIG. 8, shown is a diagram of portion of a lineage graph 900 showing a completed workflow for a new version of a data element, in accordance with an embodiment of the present disclosure. In FIG. 9, like elements of lineage graph 800 of FIG. 8 are shown using like reference designators. As such, the previous relevant discussion with respect to features of the like elements shown using like reference designators is equally applicable here.

Continuing the example above, when the new version (e.g., version 2) of the part having id: 120 is created, the workflow for the part may be performed to complete the part's data lineage. As shown in FIG. 9, product node 708 is now connected to part node 802 by directed edge 708a labeled "Refers to," indicating that the product data element refers to the new version of the part data element, and product node 714 is now connected to part node 802 by directed edge 714a labeled "Refers to," indicating that the product data element refers to the new version of the part data element. Thus, as illustrated in lineage graph 900, the workflow is now completed with the products (i.e., nodes 708, 714) which reference the part being updated with the new version of the part (i.e., node 802) as indicated by directed edges 708a, 714a and their respective labels. In some embodiments, a replaced node may be rendered using a different visual style than the other nodes in the lineage graph. For example, node 702 corresponding to part having id: 120 and version: 1 (i.e., the replaced node) may be rendered in a different color than the color of the other nodes in lineage graph 900.

In some embodiments, a replaced node (e.g., the old version of the data element) may be removed from the lineage graph and archived in a data repository (e.g., data repository 424 of FIG. 4). For example, graph generation module 418 can remove (e.g., prune) node 702 (the replaced node) from lineage graph 900 after a threshold removal time, such as, for example, 30 seconds. Removing node 702 (the replaced node) can include removing node 702 and the other nodes 704, 706 connected to node 702 from lineage graph 900. The threshold removal time may be configured as part of an organizational policy. Graph generation module 418 may store information about the nodes removed from the lineage graph within data repository 424.

It should be understood that the lineage graphs (e.g., portions of a lineage graph) shown in FIGS. 7-9 are merely simple examples and that, in practice, a lineage graph generated according to embodiments of the present disclosure may include a very large number of nodes and edges.

Figure 10:
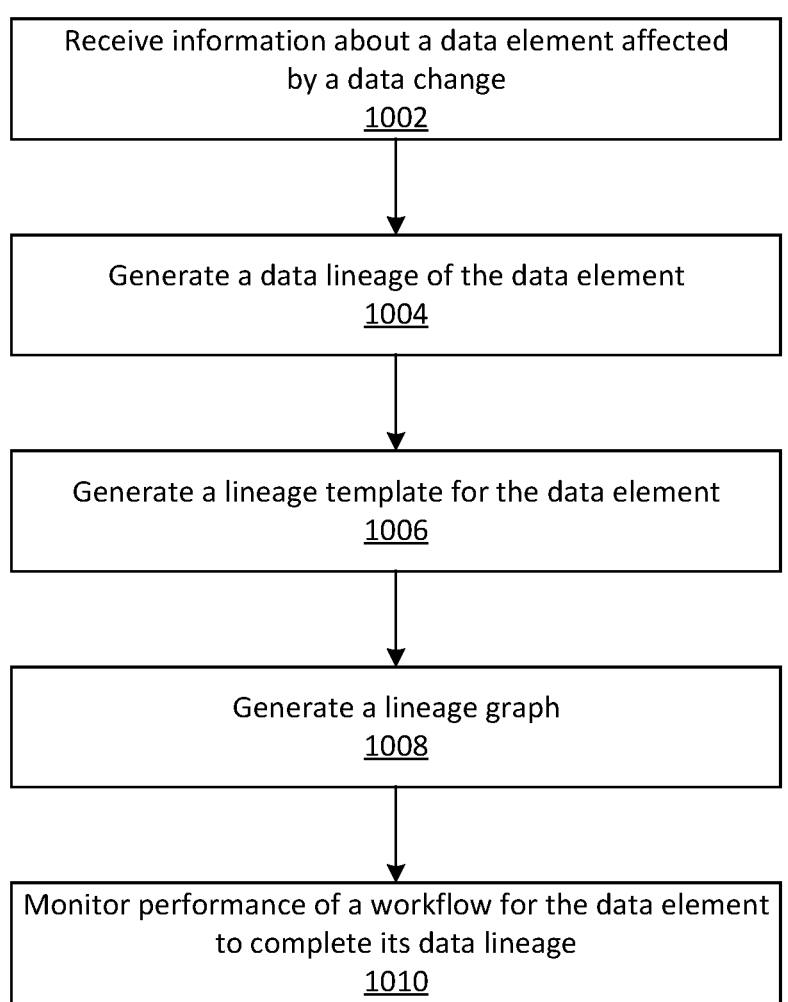
FIG. 10 is a flow diagram of an example process for tracing a data change, in accordance with an embodiment of the present disclosure.

FIG. 10 is a flow diagram of an example process 1000 for tracing a data change, in accordance with an embodiment of the present disclosure. Illustrative process 1000 may be implemented, for example, within system 400 of FIG. 4. In more detail, process 1000 may be performed, for example, in whole or in part by data collection module 414, lineage generation module 416, graph generation module 418, and workflow module 420, or any combination of these including other components of system 400 described with respect to FIG. 4.

With reference to process 1000 of FIG. 10, at 1002, information about a data element affected by a data change may be received. For example, the information may be sent by a tracer agent deployed at a data source and received by a lineage detection service (e.g., lineage detection service 408). The information may include identification and versioning information and referentiality information of the data element.

At 1004, a data lineage of the data element may be generated. The data lineage may be generated from the identification and versioning information and the referentiality information of the data element. The data lineage of the data element indicates the relationships between the data element and other data elements. In some cases, an existing data lineage of the data element may can be updated to generate the data lineage. In some embodiments, the data lineage information may be maintained in a structured table (e.g., structured table 500 of FIG. 5). In some embodiments, the structured table may be stored within a data repository (e.g., data repository 424 of FIG. 4).

At 1006, a lineage template for the data element may be generated. The lineage template may be based on the data lineage of the data element (e.g., based on the data lineage generated at 1004). The lineage template can define a workflow (e.g., one or more actions) for the data element to complete its data lineage. In some embodiments, the lineage template may be stored within a data repository (e.g., data repository 424 of FIG. 4).

At 1008, a lineage graph may be generated. The lineage graph may be generated from the data lineage information of data elements. The lineage graph may be comprised of nodes which correspond to data elements and directed edges which correspond to relationships between the nodes connected by the directed edges. The directed edges may have labels which provide further indication of how the connected nodes are related to each other. In some embodiments, the lineage graph may be stored in a graph database (e.g., graph database 426 of FIG. 4).

At 1010, performance of the workflow for the data element may be monitored. A workflow monitor (e.g., workflow module 420 of FIG. 4) can use the lineage graph to track performance of the workflow. For example, the workflow monitor can traverse or otherwise analyze the lineage graph to determine whether the actions in the workflow have been performed.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:

deploying, by a computing device, a tracer agent alongside a data source, the tracer agent configured to monitor the data source for one or more data changes wherein the tracer agent is implemented as a change-event listener executing at the data source;

detecting, by the tracer agent, a data change in a data stream;

introspecting, by the tracer agent, the data change in the data stream;

generating, by the tracer agent, a data structure comprising information about a data element affected by the data change;

receiving the data structure and generating, by the computing device, a data lineage of the data element from the data structure, wherein the data lineage indicates relationships between the data element and one or more other data elements, the one or more other data elements indicated in the received information about the data element;

generating, by the computing device, a lineage template for the data element based on data lineage information as observed by the computing device over a period of time, wherein the lineage template defines a workflow including timing and sequencing for the data element to complete the data change in the data lineage, wherein the lineage template specifies executable timing thresholds and sequence ordering for computer-executable tasks associated with the data element;

generating, by the computing device, a lineage graph based on the data lineage information, wherein the lineage graph tracks the data lineage of the data element;

causing display, by the computing device, of a dashboard of a lineage detection service and, via user-interface controls on the dashboard, receiving input to update an order value and an alert-timeout value in the lineage template;

executing, by the computing device, the workflow according to the lineage template to complete the data change, wherein the executing is performed by a workflow engine that automatically initiates the computer-executable tasks; and traversing the lineage graph to determine the performance of the workflow, including computing objective performance metrics from timestamps and edge traversal in the lineage graph.

2. The method of claim 1, wherein the information about the data element includes identification and versioning information and referentiality information of the data element.

3. The method of claim 2, wherein the one or more other data elements being indicated in the referentiality information.

4. The method of claim 1, wherein the lineage template defines one or more actions for the workflow, wherein an action of the one or more actions having values that indicate a sequencing of the action, an average time to perform the action, a minimum time to perform the action, a maximum time to perform the action, and a timeout to generate an alert.

5. The method of claim 1, wherein the lineage template provides for indicating creation, completion, and status of data tasks.

6. The method of claim 1, wherein the lineage graph is updated to show that the workflow is partially completed or completed.

7. The method of claim 1, wherein the generating the data lineage includes updating an existing data lineage of the data element.

8. The method of claim 1, wherein the generating the lineage template includes identifying an existing lineage template generated for the data element.

9. A system comprising:
one or more non-transitory machine-readable mediums configured to store instructions; and one or more processors configured to execute the instructions stored on the one or more non-transitory machine-readable mediums, wherein execution of the instructions causes the one or more processors to carry out a process comprising:

deploying a tracer agent alongside a data source, the tracer agent configured to monitor the data source for one or more data changes, wherein the tracer agent is implemented as a change-event listener executing at the data source;

detecting by the tracer agent a data change in a data stream;

introspecting the data change in the data stream using the tracer agent;

generating, by the tracer agent, a data structure comprising information about a data element affected by the data change;

receiving the data structure and generating a data lineage of the data element, wherein the data lineage indicates relationships between the data element and one or more other data elements, the one or more other data elements indicated in the received information about the data element;

generating a lineage template for the data element based on data lineage information as observed over a period of time, wherein the lineage template defines a workflow including timing and sequencing for the data element to complete the data change in the data lineage, wherein the lineage template specifies executable timing thresholds and sequence ordering for computer-executable tasks associated with the data element;

generating a lineage graph based on the data lineage information, wherein the lineage graph tracks the data lineage of the data element;

causing display, by the computing device, of a dashboard of a lineage detection service and, via user interface controls on the dashboard, receiving input to update an order value and an alert-timeout value in the lineage template;

executing the workflow according to the lineage template to complete the data change, wherein the executing is performed by a workflow engine that automatically initiates the computer-executable tasks; and traversing the lineage graph to determine the performance of the workflow, including computing objective performance metrics from timestamps and edge traversal in the lineage graph.

10. The system of claim 9, wherein the information about the data element includes identification and versioning information and referentiality information of the data element.

11. The system of claim 10, wherein the one or more other data elements being indicated in the referentiality information.

12. The system of claim 9, wherein the lineage template defines one or more actions for the workflow, wherein an action of the one or more actions having values that indicate a sequencing of the action, an average time to perform the action, a minimum time to perform the action, a maximum time to perform the action, and a timeout to generate an alert.

13. The system of claim 9, wherein the lineage graph is updated to show that the workflow is completed.

14. The system of claim 9, wherein the lineage graph shows that the workflow is partially completed.

15. A non-transitory machine-readable medium encoding instructions that when executed by one or more processors cause a process to be carried out, the process including:

deploying a tracer agent alongside a data source, the tracer agent configured to monitor the data source for one or more data changes, wherein the tracer agent is implemented as a change-event listener executing at the data source;

detecting by the tracer agent a data change in a data stream;

introspecting the data change in the data stream using the tracer agent;

generating, by the tracer agent, a data structure comprising information about a data element affected by the data change;

receiving the data structure and generating a data lineage of the data element, wherein the data lineage indicates relationships between the data element and one or more other data elements, the one or more other data elements indicated in the received information about the data element;

generating a lineage template for the data element based on data lineage information as observed over a period of time, wherein the lineage template defines a workflow including timing and sequencing for the data element to complete the data change in the data lineage, wherein the lineage template specifies executable timing thresholds and sequence ordering for computer-executable tasks associated with the data element;

generating a lineage graph based on the data lineage information, wherein the lineage graph tracks the data lineage of the data element;

causing display, by the computing device, of a dashboard of a lineage detection service and, via user-interface controls on the dashboard, receiving input to update an order value and an alert-timeout value in the lineage template;

executing the workflow according to the lineage template to complete the data change, wherein the executing is performed by a workflow engine that automatically initiates the computer-executable tasks; and traversing the lineage graph to determine the performance of the workflow, including computing objective performance metrics from timestamps and edge traversal in the lineage graph.

16. The machine-readable medium of claim 15, wherein the information about the data element includes identification and versioning information and referentiality information of the data element, the one or more other data elements being indicated in the referentiality information.

17. The machine-readable medium of claim 15, wherein the lineage template defines one or more actions for the workflow, wherein an action of the one or more actions having values that indicate a sequencing of the action, an average time to perform the action, a minimum time to perform the action, a maximum time to perform the action, and a timeout to generate an alert.

\* \* \* \* \*